(No Model.)
T. BIRCHALL.
HARNESS LEVELING DEVICE FOR LOOMS.
No. 562,350. Patented June 16, 1896.
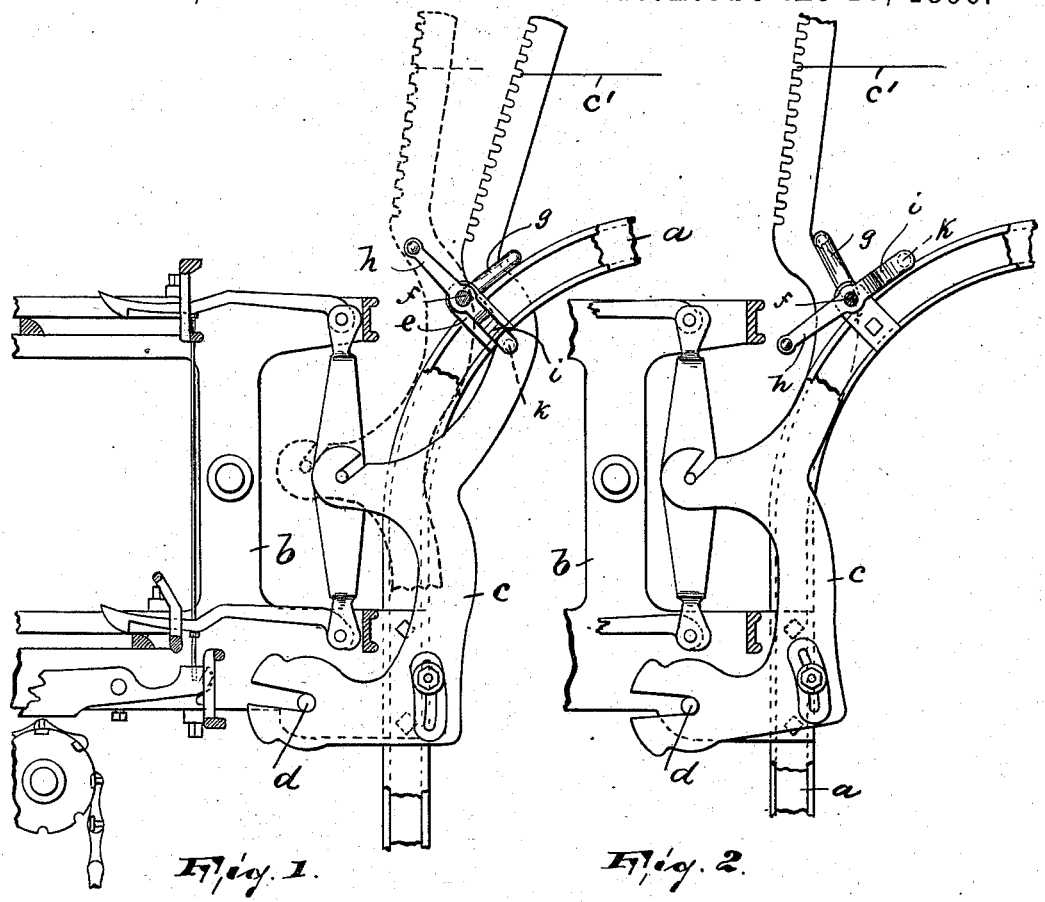
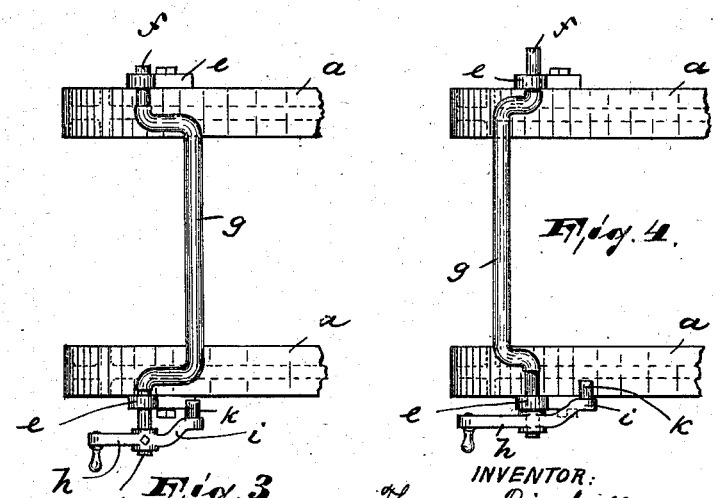
WITNESSES
INVENTOR:
Thomas Birchall

UNITED STATES PATENT OFFICE.

THOMAS BIRCHALL, OF PATERSON, NEW JERSEY, ASSIGNOR TO ROBERT ATHERTON, OF SAME PLACE.

HARNESS-LEVELING DEVICE FOR LOOMS.

SPECIFICATION forming part of Letters Patent No. 562,350, dated June 16, 1896.

Application filed February 27, 1896. Serial No. 580,968. (No model.)

*To all whom it may concern:*

Be it known that I, THOMAS BIRCHALL, a citizen of the United States, residing in Paterson, Passaic county, and State of New Jersey, have invented certain new and useful Improvements in Harness-Leveling Devices for Looms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a harness-leveling device for looms, of simple construction, and easily and quickly operated.

The invention consists in the improved harness-leveling device, and in the combination and arrangement of the various parts thereof, substantially as will be hereinafter more fully described, and finally embodied in the claim.

Referring to the accompanying drawings, in which like letters of reference indicate corresponding parts in each of the several views, Figure 1 is a side elevation of a dobby with certain portions removed and others shown in section (arranged on a portion of a loom-frame) and provided with my improved leveling device; Fig. 2, a view similar to Fig. 1, illustrating the position of parts when the leveling device is in operation; and Figs. 3 and 4 are top plan views of the leveling device as shown in Figs. 1 and 2, respectively.

In said drawings, $a$ represents a portion of the loom-frame, and $b$ the dobby-frame, secured thereto in any desired manner, and provided with the cross-rod $d$, serving as a fulcrum for the harness-levers $c$, the latter ones connected with the harness of the loom through the cords $c'$, as in the usual construction.

On each side of the dobby and secured to the loom-frame $a$, in any desired manner, is a bracket $e$, serving as bearings for the ends $f$ of the crank-shaft $g$. On one end of said crank-shaft is secured the crank or handle $h$, provided with an arm $i$, on which is arranged a horizontally inwardly projecting pin $k$, adapted to engage and bear on the loom-frame $a$, as will be hereinafter more fully described. The said crank-shaft $g$, when in normal position, Figs. 1 and 3, does not fully touch the harness-levers and bears on the loom-frame $a$, but is allowed a lateral motion in its bearings $e$, sufficient, when pushed inward, after being turned from right to left, to bring the said pin $k$ over and above and into engagement with the said loom-frame, as shown in Figs. 2 and 4.

In operation, when the warp-threads from necessity of repairing or the harness-threads for any other reason have to be brought to one level, the operator stops the machine and turns the crank-shaft $g$ by means of the handle $h$ from right to left, until the pin $k$ is over and above the loom-frame $a$. The crank-shaft is then pushed inward and the handle $h$ released. The pin $k$, bearing on the loom-frame, prevents the crank-shaft from returning to its normal position, and thus holds the harness and warp threads in a level. When the necessary repairs are done, the crank-shaft by means of its handle is pulled outward and allowed to return to its normal position.

Having thus described my invention, what I claim as new, and desire to secure by Letters Patent, is—

In a harness-leveling device, the combination with the dobby-frame and the harness-levers fulcrumed thereto, of a bracket on each side of the dobby-frame, a crank-shaft laterally movable in said brackets and adapted to be rotated therein, to thus engage and operate the harness-levers, a handle on one end of said crank-shaft, an arm projecting from said handle, and a pin projecting horizontally from said arm and adapted to engage the frame, substantially as and for the purposes described.

In testimony that I claim the foregoing I have hereunto set my hand this 17th day of February, 1896.

THOMAS BIRCHALL.

Witnesses:
ALFRED GARTNER,
EDWIN B. HINDLEY.